United States Patent
Argumedo et al.

(10) Patent No.: US 6,906,873 B2
(45) Date of Patent: Jun. 14, 2005

(54) APPARATUS AND METHOD TO MONITOR LEADER PIN POSITION

(75) Inventors: Armando J. Argumedo, Tucson, AZ (US); Edwin R. Childers, Tucson, AZ (US); Mark A. Taylor, Tucson, AZ (US); Richard A. West, Corona, AZ (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 10/357,246

(22) Filed: Feb. 3, 2003

(65) Prior Publication Data

US 2004/0150905 A1 Aug. 5, 2004

(51) Int. Cl.[7] ............................................. G11B 15/18
(52) U.S. Cl. ........................................................ 360/7
(58) Field of Search .............................. 360/71, 69, 95, 360/68, 92, 128; 242/332.4, 332.8

(56) References Cited

U.S. PATENT DOCUMENTS

| | | | | |
|---|---|---|---|---|
| 4,709,873 A | * | 12/1987 | Smith et al. | 242/332.8 |
| 4,742,407 A | * | 5/1988 | Smith et al. | 242/332.4 |
| 5,219,129 A | | 6/1993 | Spicer et al. | 242/195 |
| 5,325,249 A | * | 6/1994 | Butts et al. | 360/95 |
| 5,560,115 A | * | 10/1996 | Fowler | 33/361 |
| 5,906,324 A | * | 5/1999 | Adams et al. | 242/332.8 |
| 6,208,488 B1 | * | 3/2001 | Yamakawa et al. | 360/128 |
| 6,480,086 B1 | * | 11/2002 | Kluge et al. | 336/200 |
| 6,487,034 B1 | * | 11/2002 | Jiang et al. | 360/68 |
| 6,754,038 B2 | * | 6/2004 | Akiyama et al. | 360/92 |

* cited by examiner

*Primary Examiner*—David Hudspeth
*Assistant Examiner*—Fred F. Tzeng
(74) *Attorney, Agent, or Firm*—Dale F. Regelman

(57) ABSTRACT

A method and apparatus to monitor the positioning of a tape leader pin in a tape threader block moveably disposed in a tape drive. The' apparatus includes a tape threader block assembly comprising a first circuit having a first coil, a second circuit having a second coil, where that second circuit has an impedance, where the first coil is disposed adjacent the second coil. The apparatus further includes a detection circuit which detects the impedance of the second circuit, where the second circuit has a first impedance when the first circuit is open, and where the second circuit has a second impedance when the second circuit is closed. In the event a tape leader pin is properly releaseably fixtured to Applicants' threader block, the first circuit is closed and the impedance of the second circuit changes. The detection circuit detects that impedance change and provides a signal to a controller indicating that the tape leader pin is properly seated in the threader block.

25 Claims, 13 Drawing Sheets

APPARATUS AND METHOD TO MONITOR LEADER PIN POSITION

FIELD OF THE INVENTION

Applicant's invention relates to an apparatus and method to monitor the position of a tape leader pin in a tape drive assembly.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape medium housed in a portable cartridge.

One (or more) accessors typically accesses a tape cartridge from its storage slots and delivers that cartridge to a data storage device for reading and/or writing data on the accessed media. Suitable electronics operate the accessor(s) and operate the data storage device(s) to provide information to, and/or to receive information from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3584 Media Storage Library. Some of the automated media storage libraries have dual or multiple accessors to provide a level of redundancy and to enhance performance.

SUMMARY OF THE INVENTION

Applicants' invention includes a method and apparatus to monitor the positioning of a tape leader pin in a tape threader block moveably disposed in a tape drive. Applicants' apparatus includes a tape threader block assembly comprising a first circuit having a first coil, a second circuit having a second coil, where that second circuit has an impedance, where the first coil is disposed adjacent the second coil. Applicants' apparatus further includes a detection circuit which detects the impedance of the second circuit, where the second circuit has a first impedance when the first circuit is open, and where the second circuit has a second impedance when the first circuit is closed. In the event a tape leader pin is properly releaseably fixtured to Applicants' threader block, the first circuit is closed and the impedance of the second circuit changes. The detection circuit detects that impedance change and provides a signal to a controller indicating that the tape leader pin is properly seated in the threader block.

Applicants' invention further includes a tape drive which includes Applicants' threader block. Applicants' invention further includes a data storage and retrieval system which includes at least one of Applicants' tape drives. Applicants' invention further includes a method to monitor the position of a tape leader pin using Applicants' apparatus. Applicants' invention further includes an article of manufacture comprising a computer useable medium having computer readable program code disposed therein for monitoring leader pin positioning in a threader block. Applicants' invention further includes computer program products embodied as program code to monitor leader pin positioning in a threader block.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's method is not meant, however, to limit Applicant's invention to either data storage and retrieval systems, or to data processing applications, as the invention herein can be applied to use of magnetic tape storage media in general.

Figure 1:
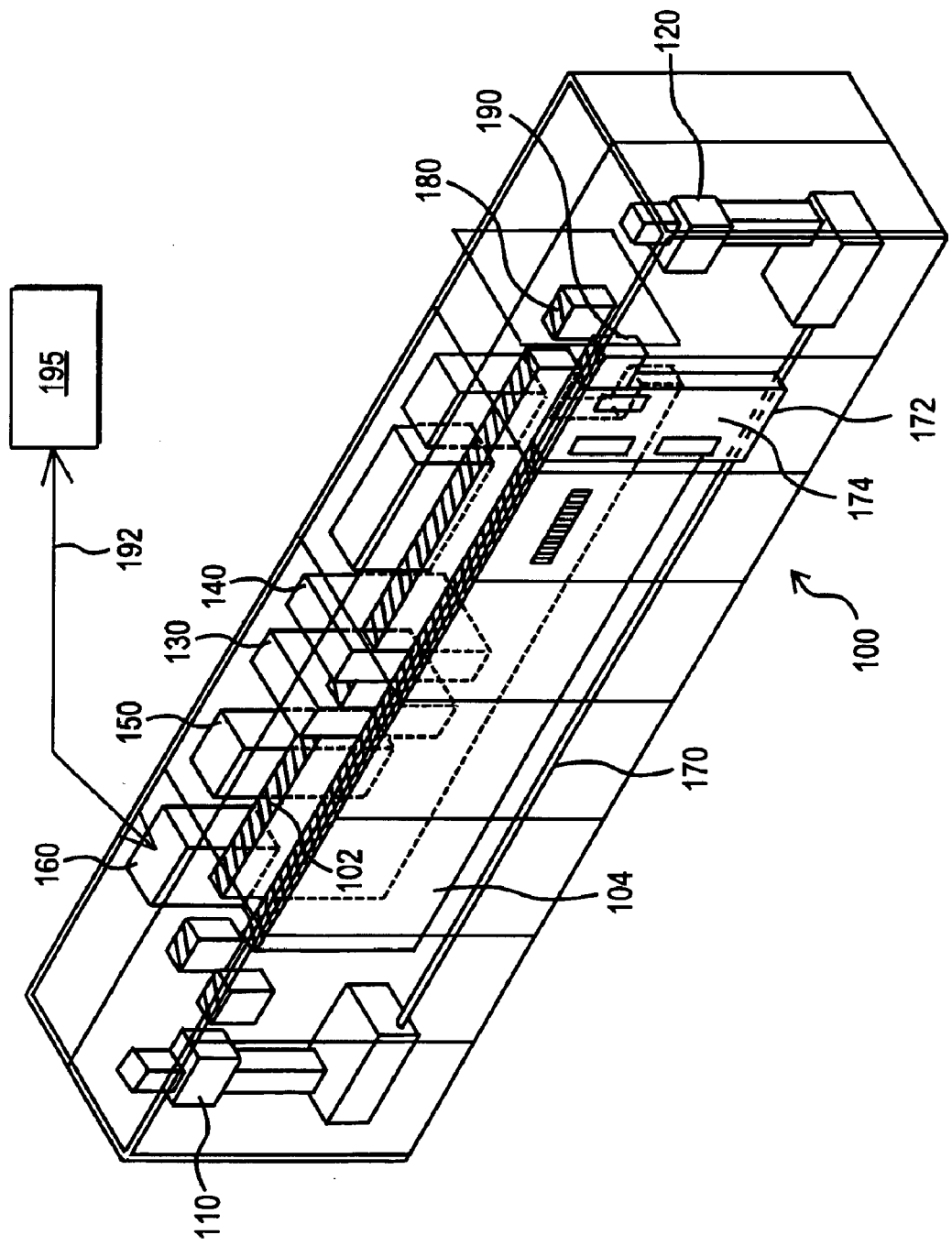
FIG. 1 is a perspective view of a first embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. As shown in FIG. 1, accessors 110 and 120 travel bi-directionally along rail 170 in an aisle disposed between first wall of storage slots 102 and second wall of storage slots 104.

In certain embodiments, device 160 comprises a library controller. In certain of these embodiments, library controller 160 is integral with a computer. In other embodiments, Applicants' data storage and retrieval system utilizes a distributed control network. In these distributed control network embodiments, device 160 may comprise a motion card pack. Device 160 communicates with one or more host computers, such as host computer 195, via communication link 192.

Referring again to FIG. 1, operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

Figure 2:
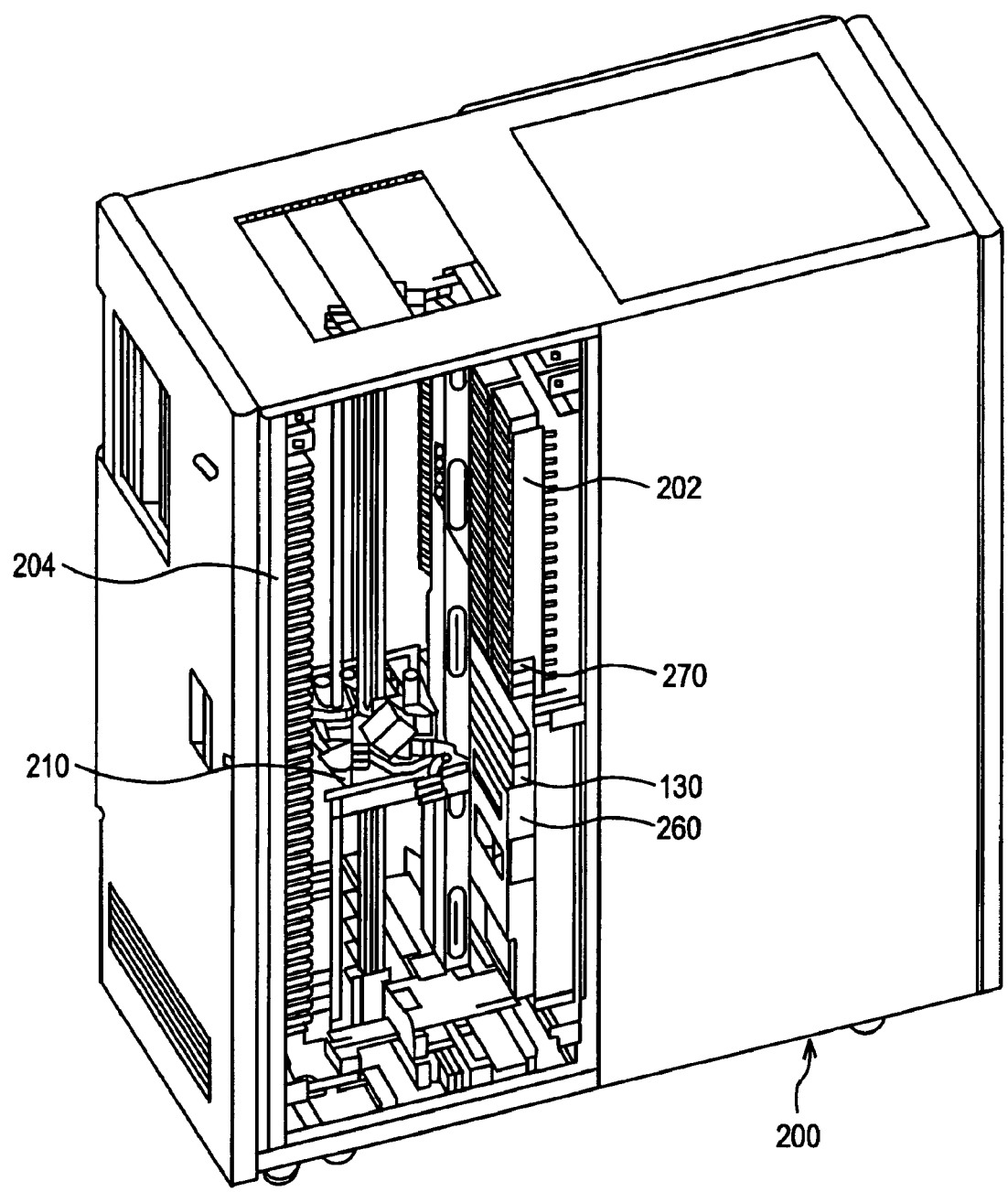
FIG. 2 is a perspective view of a second embodiment of Applicant's data storage and retrieval system.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes one or more data storage devices, such as device 130. Data storage device 130 comprises a magnetic tape drive. System 200 further includes controller/motion card pack 260. System 200 further includes operator control panel 150 (not shown in FIG. 2).

System 200 further includes one or a plurality of portable data storage cartridges, such as cartridges 270, removeably disposed in one or more slots in storage walls 202/204. Each such cartridge contains a tape storage medium internally disposed therein. System 200 also includes at least one robotic accessor 210 for transporting a designated tape storage medium between a storage slot disposed in first wall 202 or second wall 204 and data storage device 130.

As those skilled in the art will appreciate, in order to read and/or write information from and/or to a magnetic tape, that tape must first be accessed from its storage cassette and properly threaded in a tape drive, such as tape drive 130 (FIGS. 1, 2)/140 (FIG. 1). In order to thread the tape in the tape drive, the tape includes a leader pin disposed on one end. The tape drive includes a threader block which includes a leader pin fixturing mechanism.

After a tape cartridge is inserted into the tape drive, the threader block accesses the leader pin disposed on the magnetic tape, and releaseably attaches that leader pin to the threader block. Applicants' invention includes an apparatus and method to determine if the tape's leader pin is properly disposed in the threader block before attempting to thread the tape in the tape drive. Prior art apparatus and methods simply assume the leader pin is properly seated in the threader block, and the threading operation automatically commences. In the event the leader pin is not properly seated in the threader block, the threading operation does not complete correctly. Because the tape drive is unable to rewind the improperly threaded tape and again attempt to thread the tape, the tape drive requires manual disassembly, repair, and reassembly. As those skilled in the art will appreciate, such manual intervention is costly and necessarily requires the tape drive be taken out of service.

Figure 3A:
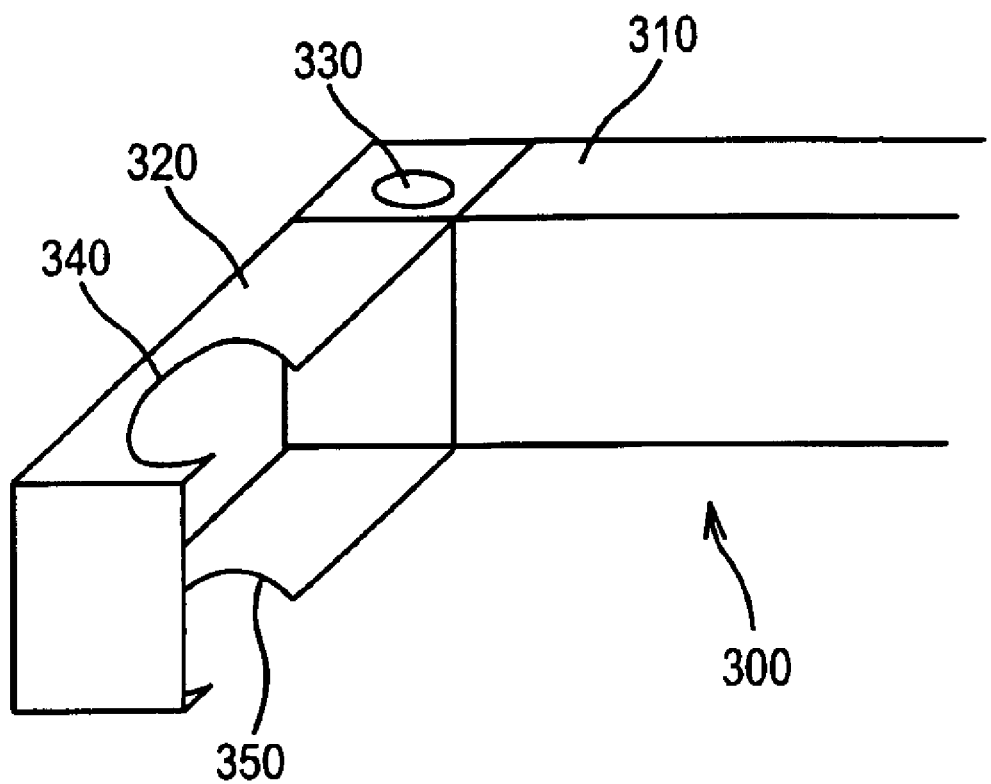
FIG. 3A is a perspective view showing certain mechanical features of Applicants' threader block.
Figure 3A:
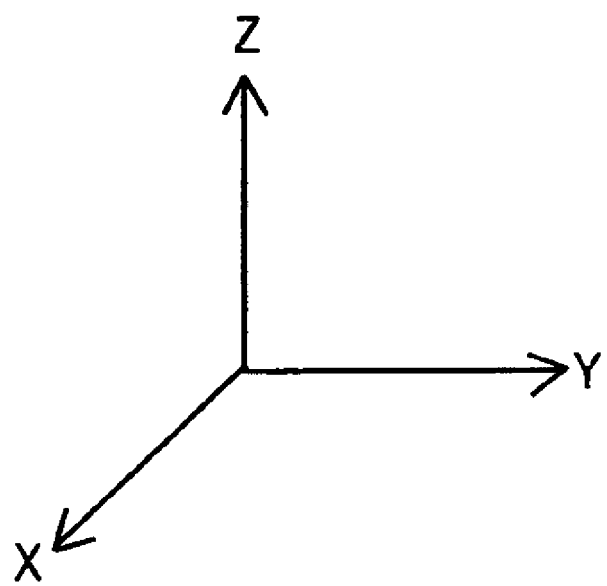

FIG. 3A shows certain mechanical features of Applicants' threader block 300. Applicants' threader block 300 comprises one component of Applicants' tape drive 130 (FIGS. 1, 2)/140 (FIG. 1). Threader block 300 includes first member 310 and second member 320. Second member 320 is pivotably attached to member 310 at pivot point 330. Member 320 is rotatable around the Z axis. Member 320 includes first fixturing device 340 and second fixturing device 350. Fixturing devices 340 and 350 are capable of releaseably fixturing a leader pin disposed on the end of a magnetic tape.

Figure 3B:
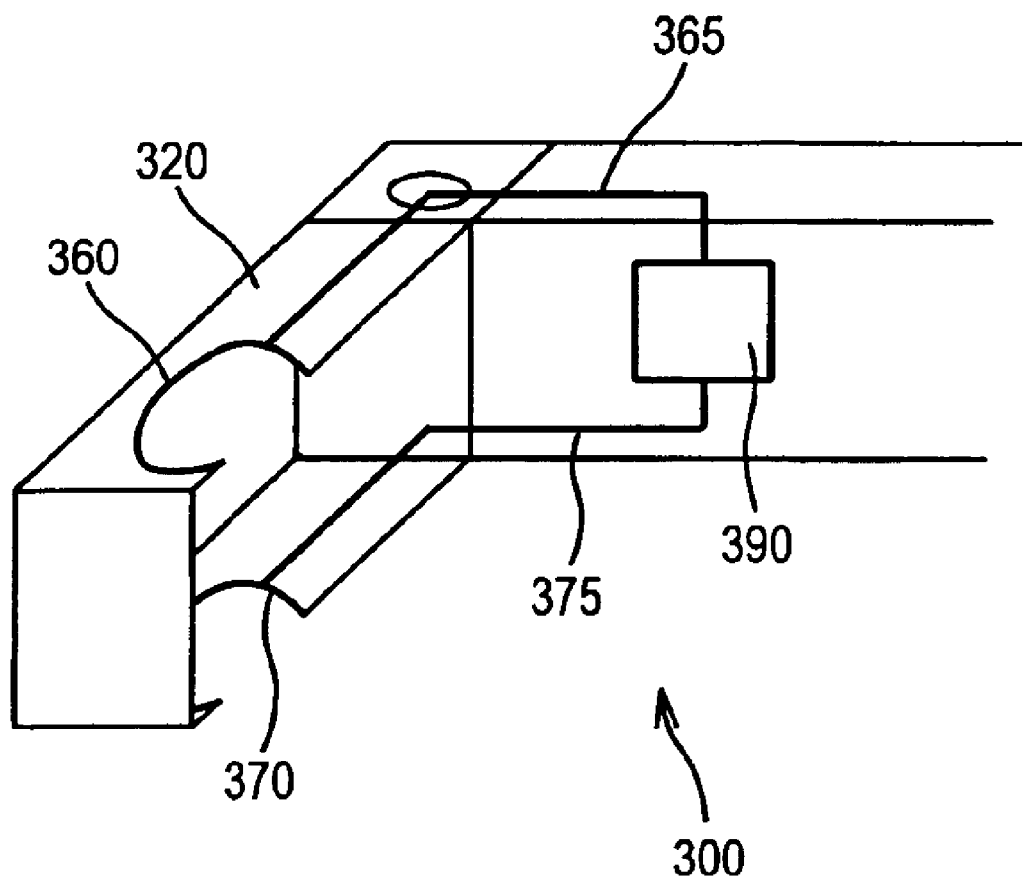
FIG. 3B is a perspective view showing certain electrical features of a first embodiment of Applicants' threader block.

FIG. 3B, shows certain electrical features of a first embodiment of Applicants' threader block 300. Threader block 300 further includes a first electrical contact 360 (FIGS. 3B, 3C, 4A, 4D, 4E) disposed on first fixturing device 340 (FIG. 3A) and a second electrical contact 370 (FIGS. 3B, 3C, 4A, 4D) disposed on second fixturing device 350 (FIG. 3A). In this embodiment, conductor 365 (FIGS. 3B, 3C, 4A, 4D) electrically connects first electrical contact 360 to first coil 390 (FIGS. 3B, 4A, 4B, 4C, 5A, 5B). In this embodiment, conductor 375 (FIGS. 3B, 3C, 4A, 4D) electrically connects second electrical contact 370 to first coil 390.

Figure 3C:
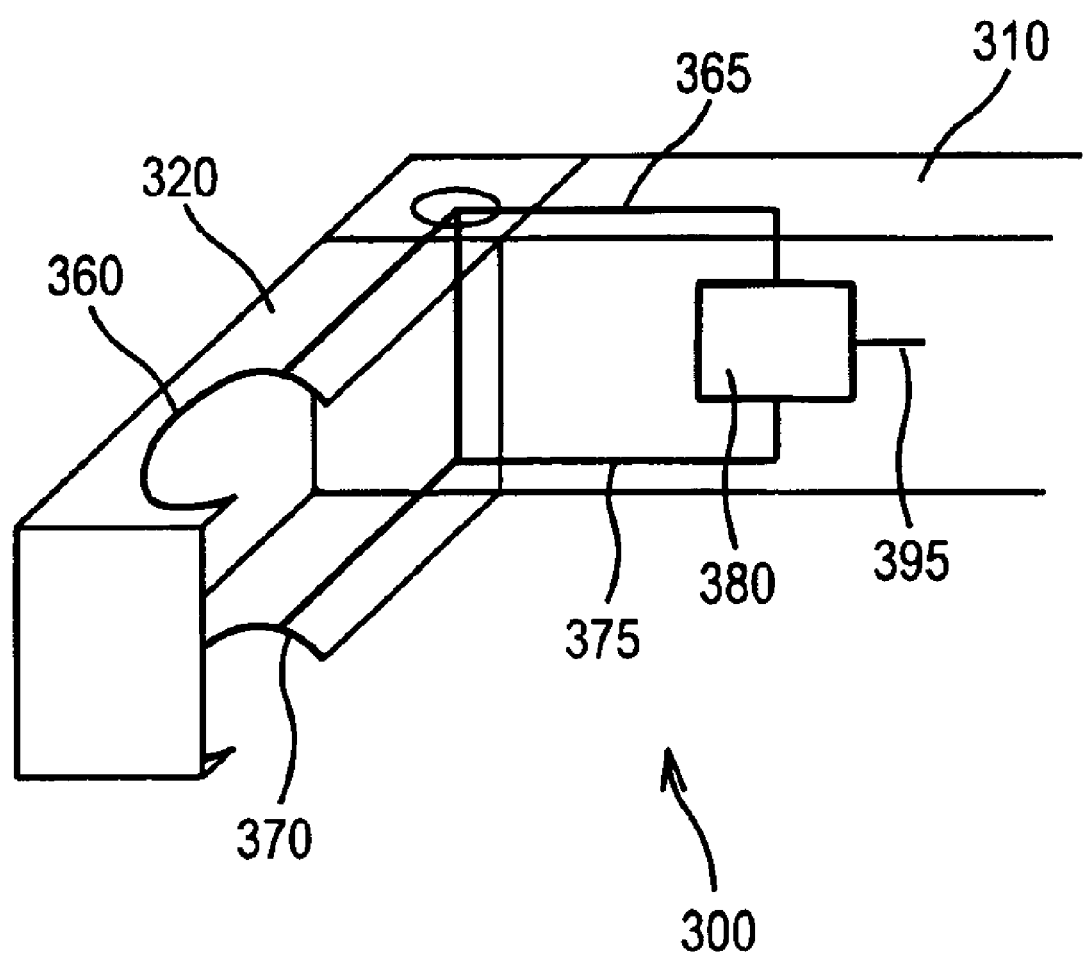
FIG. 3C is a perspective view showing certain electrical features of a second embodiment of Applicants' threader block.
Figure 4A:
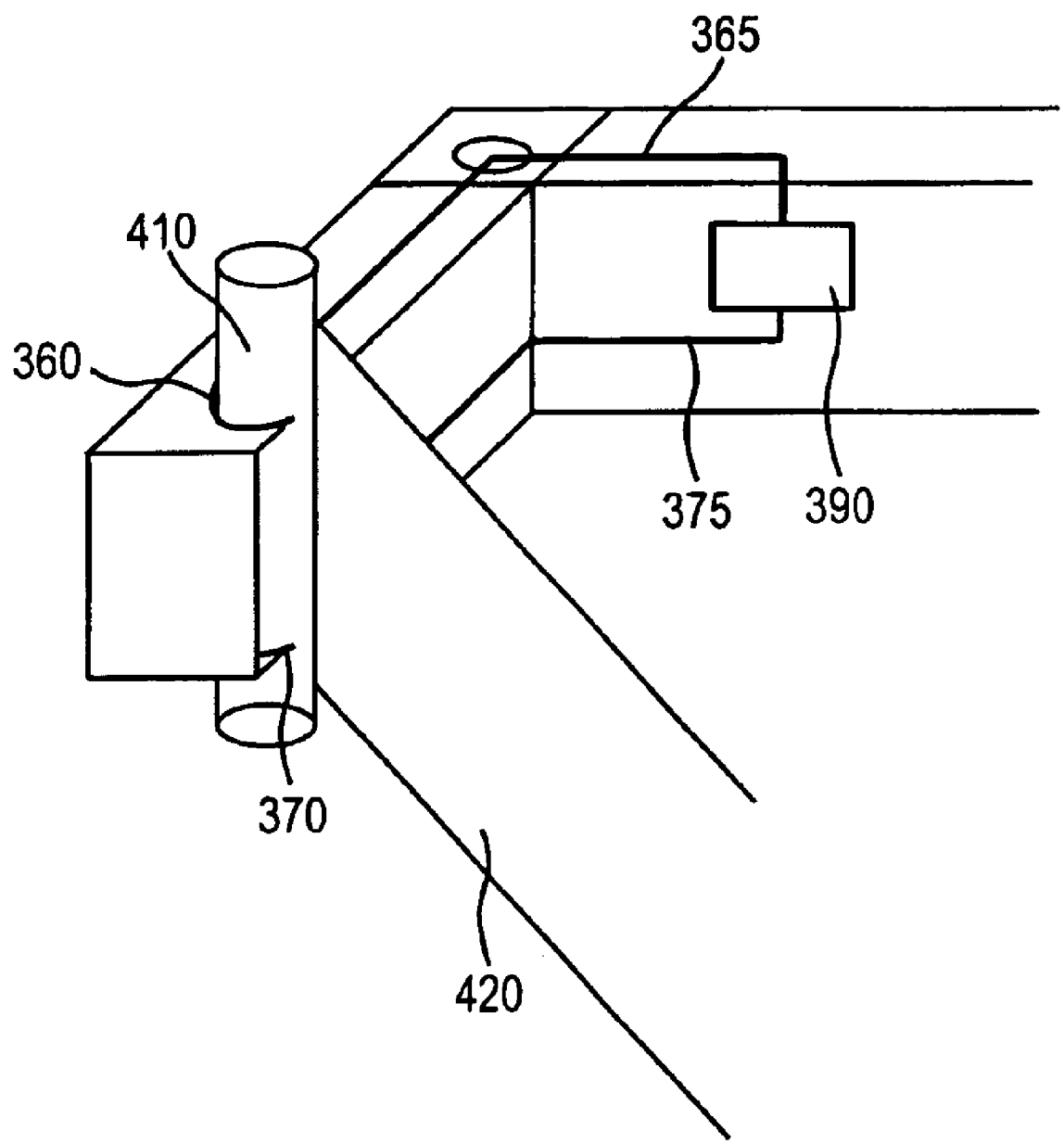
FIG. 4A is a perspective view showing a tape leader pin properly seated in the threader block of FIG. 3B.

FIG. 3C, shows certain electrical features of a second embodiment of Applicants' threader block 300. Threader block 300 further includes a first electrical contact 360 disposed on first fixturing device 340 (FIG. 3A) and a second electrical contact 370 disposed on second fixturing device 350 (FIG. 3A). In this embodiment, conductor 365 electrically connects first electrical contact 360 to detection device 380 (FIGS. 3C, 4D, 5B). In this embodiment, conductor 375 electrically connects second electrical contact 370 to detection device 380. Communication link 395 interconnects detection device 380 to a tape drive controller.

In the embodiment of FIG. 3C, detection device 380 is disposed on first member 310. In other embodiments, detection device 380 is disposed on second member 320. In yet other embodiments, detection device 380 is partly disposed on first member 310 and partly disposed on second member 320.

Upon insertion of a tape cartridge into Applicants' tape drive, such as tape drive 130/140, Applicants' threader block accesses and attempts to properly fixture the tape leader pin disposed on the magnetic tape. Referring to FIG. 4A, tape leader pin 410 is shown properly seated in Applicants' threader block 300. Tape leader pin 410 comprises an electrically conductive material. As those skilled in the art will appreciate, magnetic tape 420 is attached to leader pin 410.

If tape leader pin 410 (FIGS. 4A, 4B) is properly disposed in first fixturing device 340 (FIG. 3A), leader pin 410 makes electrical contact with first conductor 360 (FIGS. 3B, 3C, 4A, 4D, 4E). If tape leader pin 410 is properly disposed in second fixturing device 350 (FIG. 3A), leader pin 410 makes electrical contact with second conductor 370 (FIGS. 3B, 3C, 4A, 4D). If tape leader pin 410 is properly seated in threader block 300 (FIGS. 3A, 3B), then an electric circuit 510 (FIGS. 5A, 5B) is completed. Using the threader block assembly of FIG. 3B, circuit 510 comprises leader pin 410, conductor 360, conductor 365, conductor 370, conductor 375, and first coil 390 (FIGS. 3B, 4A, 4B, 4C, 5A, 5B).

Figure 4B:
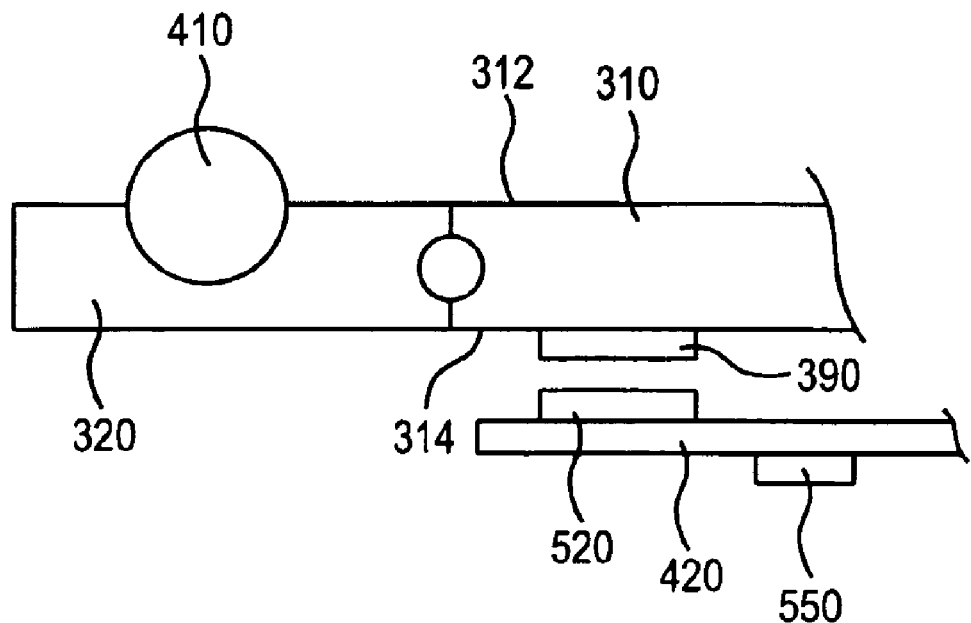
FIG. 4B is a top view of one embodiment of Applicants' tape drive comprising the threader block of FIG. 3B.

Referring now to FIG. 4B, certain embodiments of Applicants' tape drive comprising the threader block of FIG. 3B, further include assembly 420 disposed adjacent side 314 of member 310. First coil 390 is disposed on side 314. Second coil 520 is disposed on assembly 420 such that second coil 520 is disposed adjacent first coil 390, and such that first coil 390 and second coil 520 can inductively couple. First coil 390 in combination with second coil 520 comprises an air core transformer.

Figure 5A:
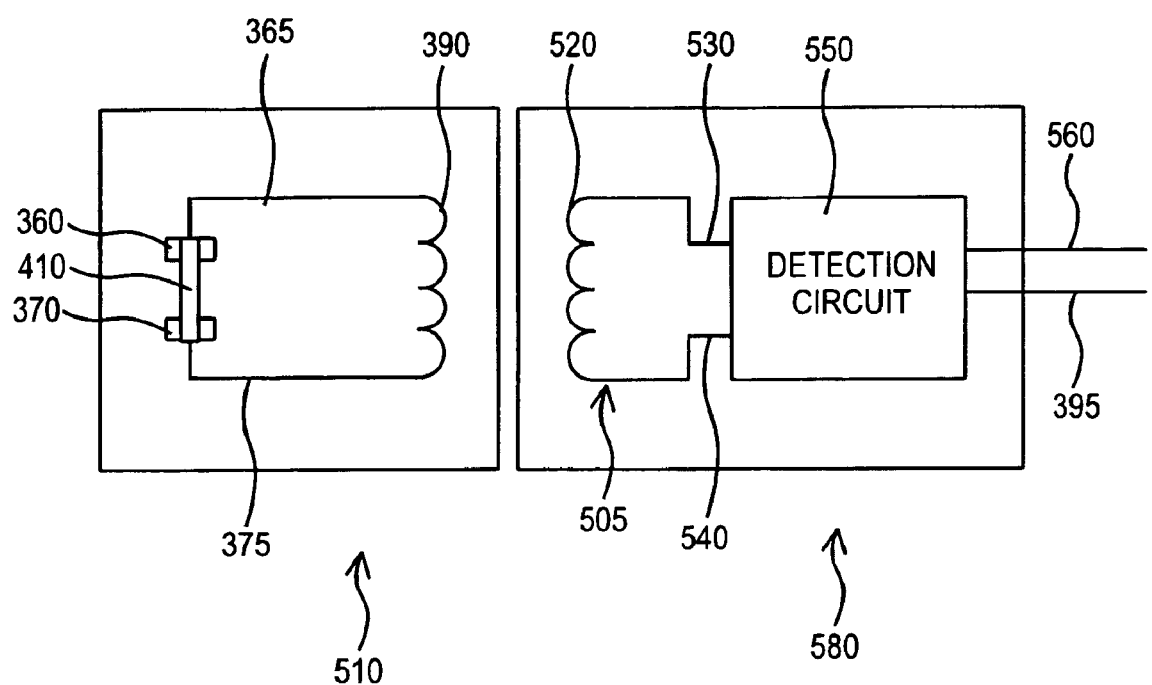
FIG. 5A is block diagram showing certain electrical features of Applicants' tape drive comprising the embodiments of either FIG. 4B or 4C.
Figure 5B:
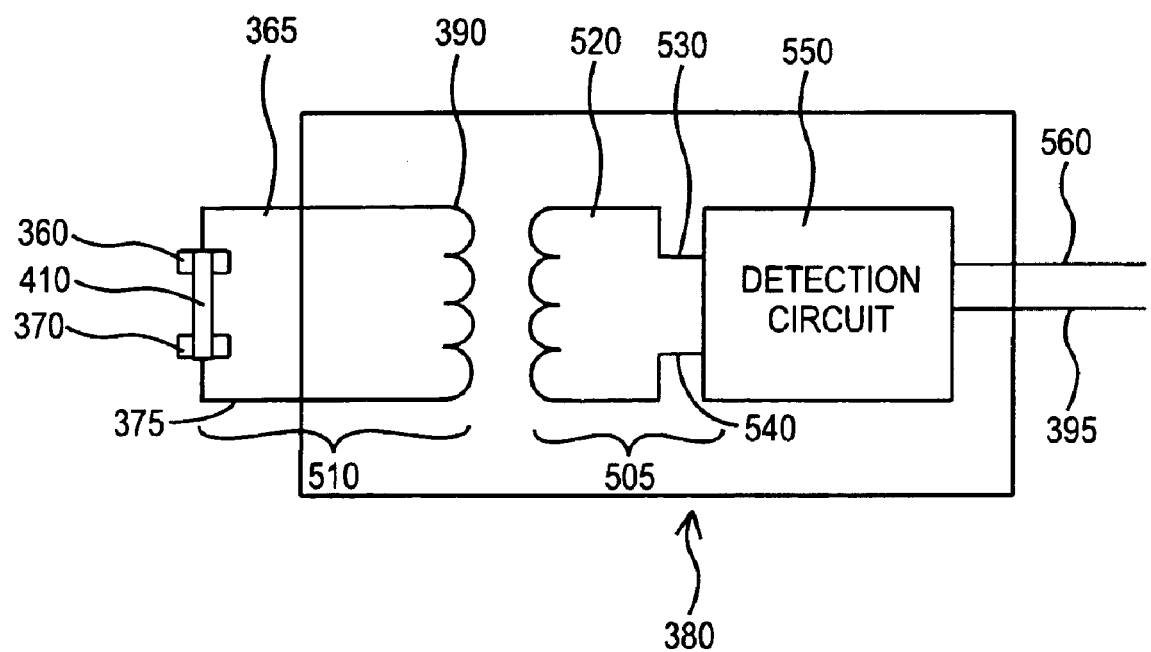
FIG. 5B is a block diagram showing certain electrical features of Applicants' tape drive comprising the embodiment of FIG. 4D.

Referring to FIG. 5A, circuit 510 is disposed on Applicant's threader block 300. In this embodiment, detection device 580 is disposed on assembly 420. Detection device 580 comprises second coil 520, conductor 530, conductor 540, and detection circuit 550. Detection device 580 receives power from power cable 560. Detection circuit 550 measures the impedance of reference circuit 505 (FIGS. 5A, 5B).

Figure 4C:
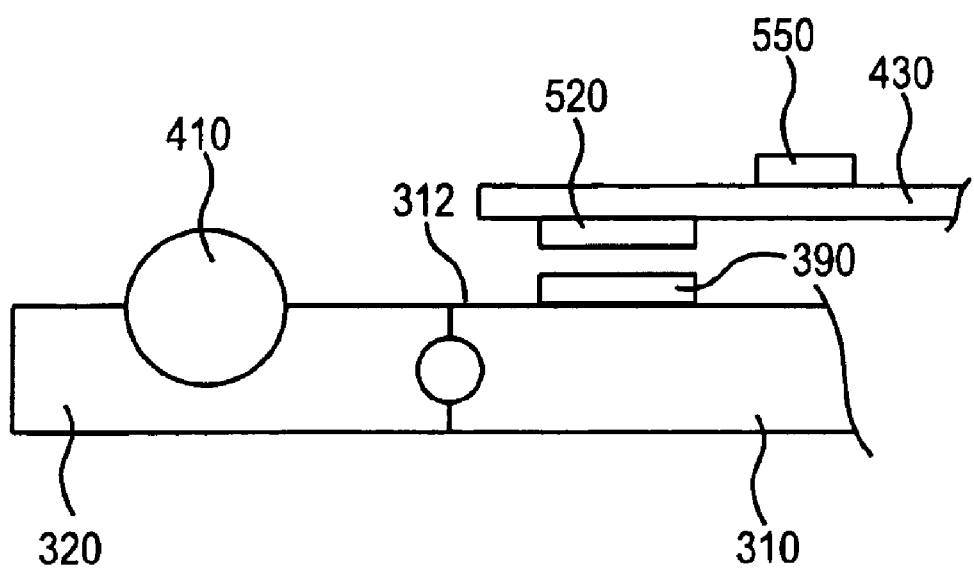
FIG. 4C is a top view of a second embodiment of Applicants' tape drive comprising the threader block of FIG. 3B.
Figure 4D:
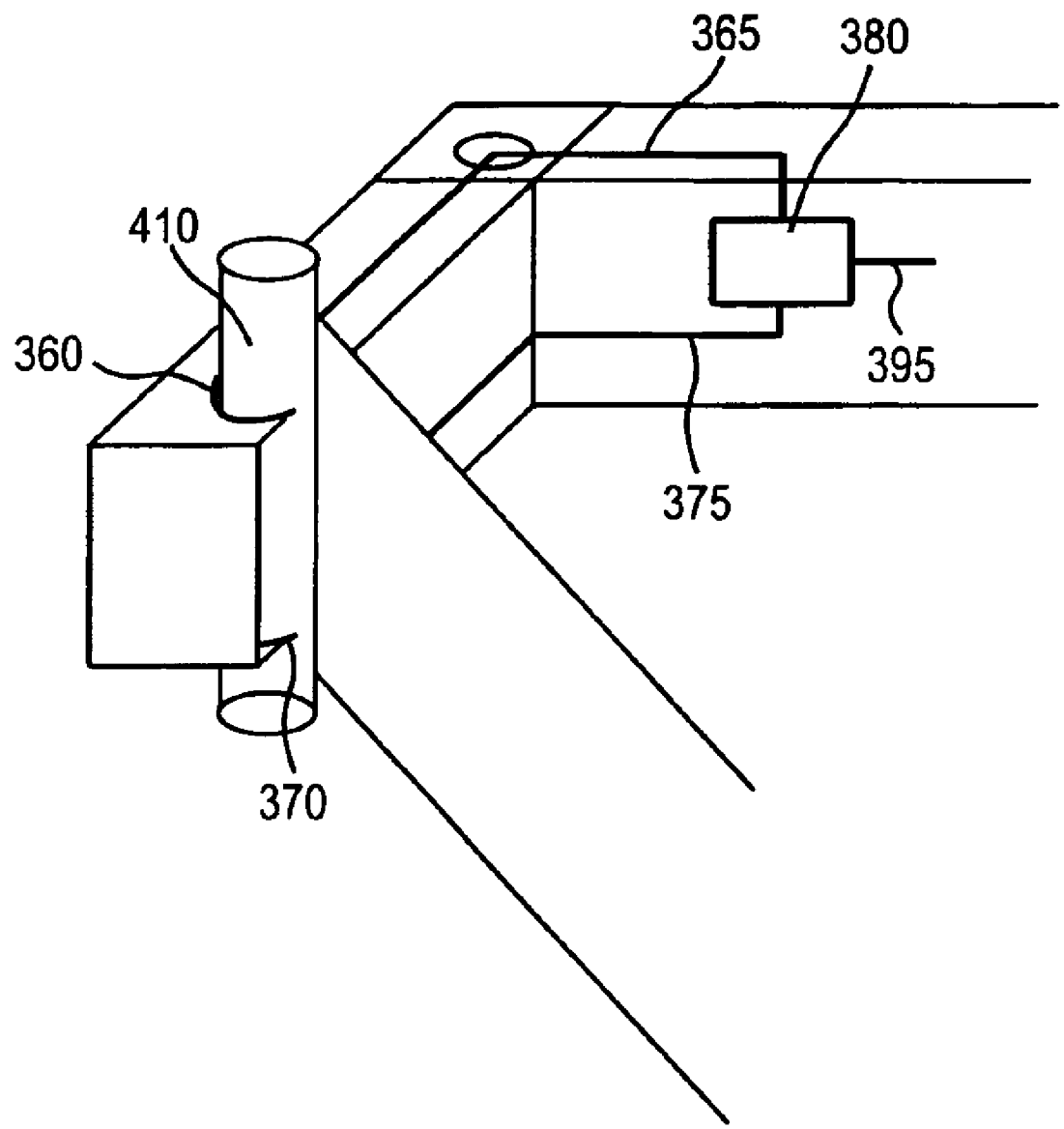
FIG. 4D is a perspective view showing a tape leader pin properly seated in the threader block of FIG. 3C.

Referring now to FIG. 4C, certain embodiments of Applicants' tape drive comprising the threader block of FIG. 3B, further include assembly 430 disposed adjacent side 312 of member 310. First coil 390 (FIGS. 3B, 4A, 4B, 4C, 5A, 5B) is disposed on side 312. Second coil 520 is disposed on assembly 430 such that second coil 520 is disposed adjacent first coil 390, and such that first coil 390 and second coil 520 can inductively couple. First coil 390 in combination with second coil 520 comprises an air core transformer.

Referring again to FIG. 5A, circuit 510 is disposed on Applicant's threader block 300. In this embodiment, detection device 580 (FIG. 5A) is disposed on assembly 430. Detection device 580 (FIG. 5A) comprises second coil 520, conductor 530, conductor 540, and detection circuit 550. Detection device 580 receives power from power cable 560. Detection circuit 550 measures the impedance of reference circuit 505.

Referring now to FIG. 4D, in embodiments of Applicants' tape drive comprising the threader block of FIG. 3C, detection device 380 (FIGS. 3C, 4D, 5B) is disposed on Applicants' threader block 300. Referring to FIG. 5B, detection device 380 comprises circuit 510, reference circuit 505, and detection circuit 550. First coil 390 is disposed adjacent second coil 520. First coil 390 in combination with second coil 520 comprises an air core transformer.

In the embodiments of FIGS. 4B, 4C, and/or 4D, when circuit 510 is open, i.e. prior to properly seating a leader pin in Applicants' threader block, reference circuit 505 has a first impedance. This first impedance can be measured, or in the alternative calculated based upon circuit components. When circuit 510 is completed by proper fixturing of leader pin 410, first coil 390 and second coil 520 inductively couple resulting in a change in the impedance of reference circuit 505 (FIGS. 5A, 5B). Detection circuit 550 detects this impedance change. In certain embodiments of Applicants' method, upon tape insertion into Applicants' tape drive unit, if detection circuit 550 detects a change in the impedance in reference circuit 505, then detector 380 (FIGS. 3C, 4D, 5B)/580 (FIG. 5A) provides a signal. In certain embodiments of Applicants' method, upon tape insertion into Applicants' tape drive unit, if detection circuit 550 does not detect a change in the impedance in reference circuit 505, then detector 380 (FIGS. 3C, 4D, 5B)/580 provides a signal.

Figure 4E:
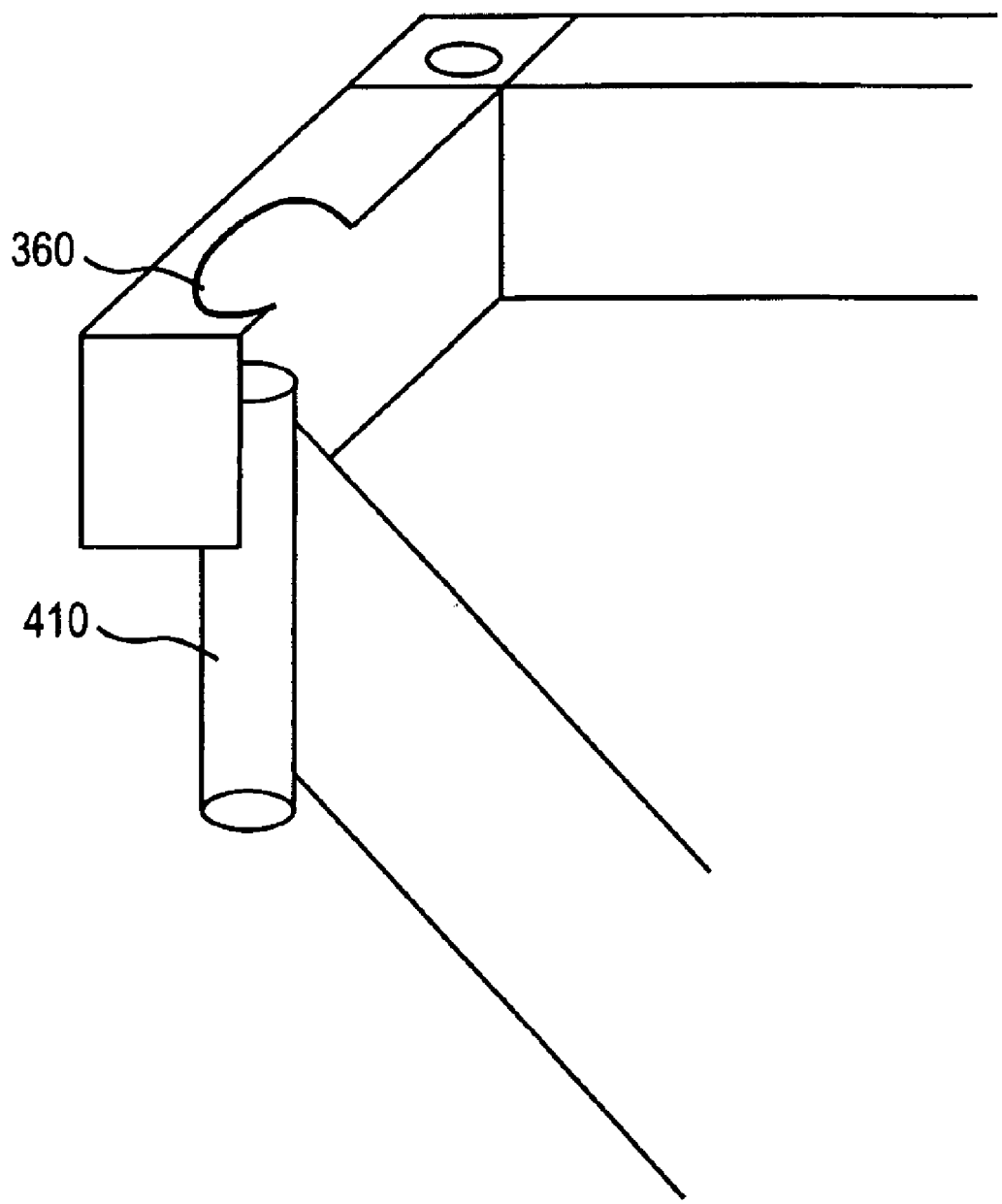
FIG. 4E is a perspective view showing a tape leader pin improperly seated in Applicants' threader block.

Referring now to FIG. 4E, leader pin 410 is shown releaseably attached to second fixturing device 350 (FIG. 3A) but not releaseably attached to first fixturing device 340 (FIG. 3A). As those skilled in the art will appreciate, in the embodiment of FIG. 4E leader pin 410 is not properly seated in threader block 300. Attempts to thread tape 420 using the embodiment of FIG. 4E would likely result in manual disassembly and repair of the tape drive. Significantly, in the configuration of FIG. 4E leader pin 410 does not complete first circuit 510 (FIGS. 5A, 5B). Therefore in the embodiment of FIG. 4E, Applicants' method would determine that leader pin 410 is not properly seated in the threader block assembly. In response, certain error recovery procedures are performed, and/or an error message is provided, and/or a different tape drive unit is designated.

Figure 6:
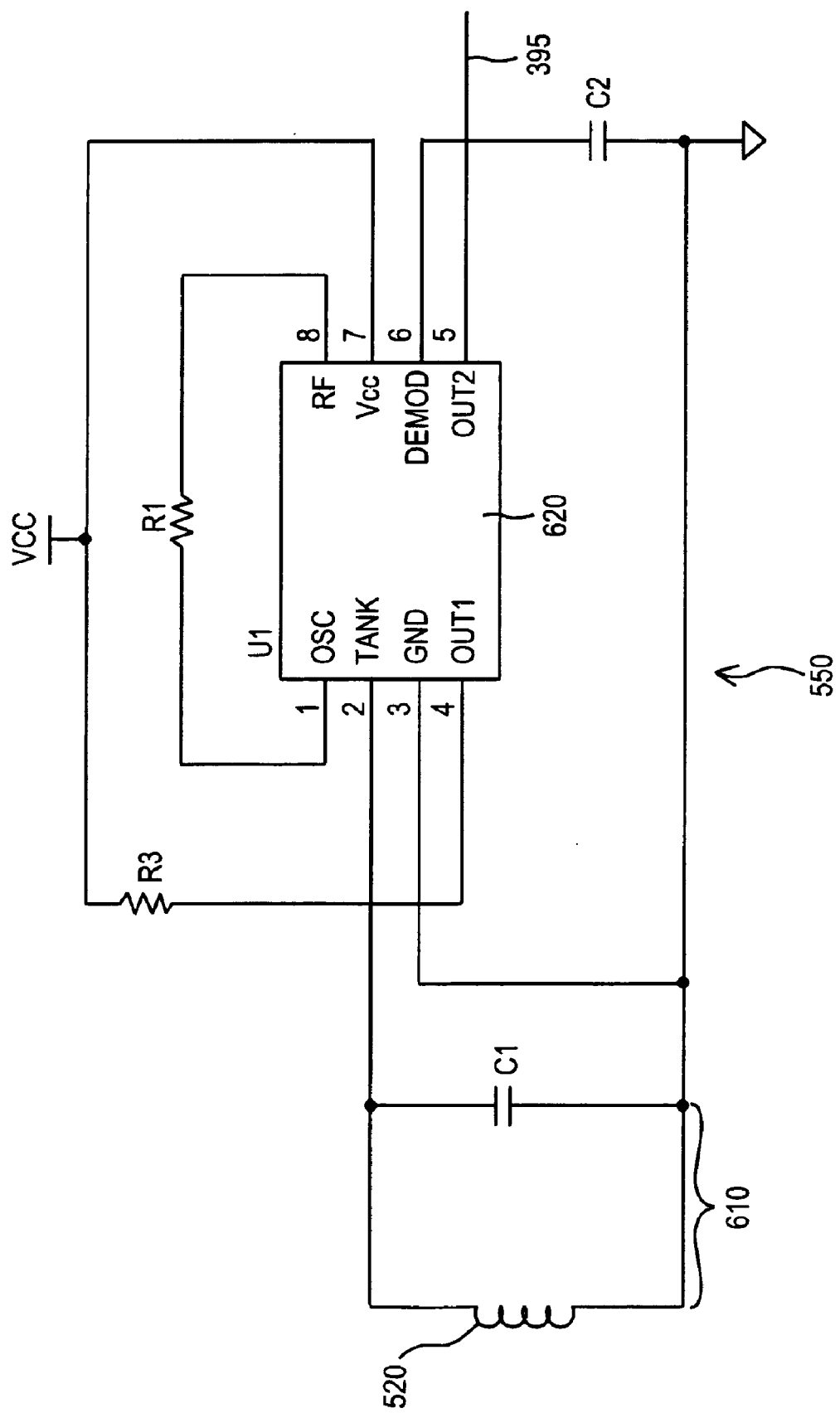
FIG. 6 is a circuit diagram showing one embodiment of Applicants' detection circuit.

FIG. 6 shows one embodiment of detection circuit 550. In this embodiment, detection circuit 550 includes LC tank circuit 610 and chip 620. In this embodiment, LC tank circuit 610 comprises reference circuit 505. Chip 620 monitors the impedance of LC tank circuit 610. In certain embodiments, chip 620 comprises a chip sold in commerce having the trade name CS209A, where that CS209A chip is sold by ON Semiconductor.

If the impedance of circuit 610 changes after inserting a tape cartridge into Applicants' tape drive 130 (FIGS. 1, 2)/140 (FIGS. 1, 2), in certain embodiments, chip 620 provides via communication link 395 first information to a tape drive controller. That first information indicates that the tape leader pin, such as leader pin 410 (FIGS. 4A, 4B), is properly seated in Applicants' threader block 300 (FIGS. 3A, 3B) moveably disposed in Applicants' tape drive.

In certain embodiments, if the impedance of circuit 610 changes after inserting a tape cartridge into Applicants' tape drive, chip 620 provides via communication link 395, first information to a library controller, such as library controller 160 (FIG. 1)/260 (FIG. 2). That first information indicates that the tape leader pin, such as leader pin 410, is properly seated in Applicants' threader block 300 moveably disposed in Applicants' tape drive 130/140.

Figure 7:
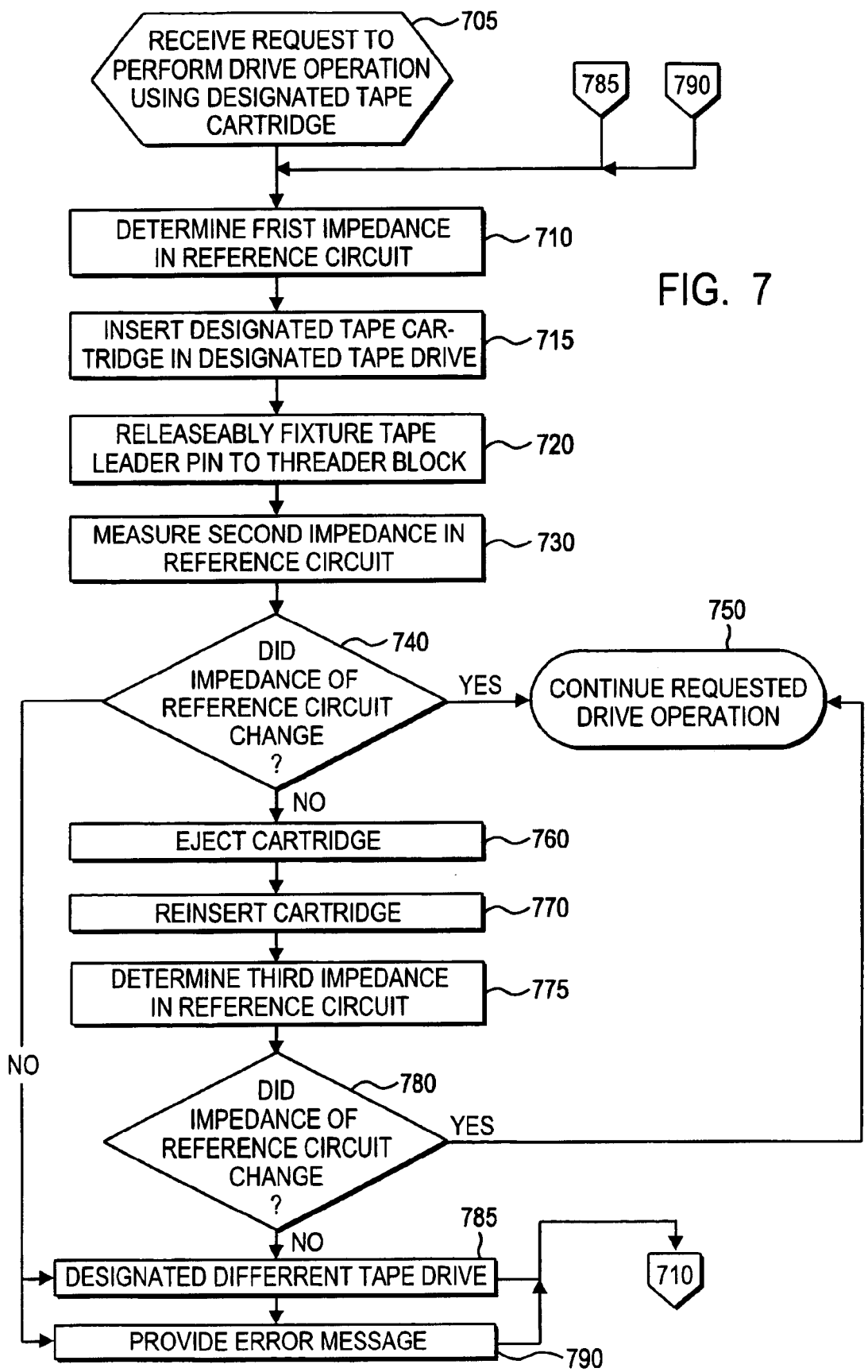
FIG. 7 is a flowchart summarizing the steps in Applicants' method.

Applicants' invention includes a method to monitor the position of a tape leader pin, such as leader pin 410 (FIGS. 4A, 4B), in Applicants' threader block 300 (FIGS. 3A, 3B) disposed in Applicants' tape drive 130 (FIGS. 1, 2)/140 (FIG. 1) which is disposed in Applicants' data storage and retrieval system 100 (FIG. 1)/200 (FIG. 2). FIG. 7 summarizes the steps in Applicants' method.

In step 705, Applicants' tape drive receives a request from one or more host computers, such as host computer 195 (FIG. 1), to perform a drive operation using a designated tape medium and a designated tape drive. Such a drive operation may comprise, for example, a write operation, a read operation, an erase operation, and the like. In response to that request, Applicants' method causes an accessor, such as accessor 110 (FIG. 1), to retrieve the designated tape from its storage slot. That accessor delivers the designated tape to the designated tape drive, and in step 705 inserts that tape into the designated tape drive. In certain embodiments, the designated tape medium is disposed in a housing, i.e. a tape cartridge.

In step 710, at a first time prior to insertion of the designated tape into the designated tape drive, Applicants' method in step 710 determines a first impedance of a reference circuit, such as circuit 505 (FIGS. 5A, 5B). In certain embodiments, the first impedance is calculated based upon the components comprising circuit 505. In certain embodiments, the first impedance is measured using a detection device, such as detection device 380 (FIGS. 3C, 4D, 5B)/580 (FIG. 5A).

Applicants' method transitions from step 710 to step 715 wherein at a second time the designated tape is inserted in the designated tape drive. Applicants' method transitions from step 715 to step 720 wherein Applicants' method causes Applicants' threader block, such as threader block 300 (FIGS. 3A, 3B), to access and fixture the leader pin, such as leader pin 410 (FIGS. 4A, 4B), disposed on the magnetic tape, such as tape 420 (FIGS. 4A, 4B).

Applicant's method transitions from step 720 to step 730 wherein, at a third time subsequent to insertion of the designated tape in the designated tape drive, Applicants' method measures the impedance of the reference circuit, i.e. determines a second impedance.

In step 740, Applicants' method compares the first impedance of step 710 to the second impedance of step 730. If Applicants' method determines in step 740 that the impedance of the reference circuit changed, i.e. if the second impedance substantially differs from the first impedance, then Applicants' method transitions from step 740 to step 750 wherein the requested tape drive operation is performed. By "substantially differs," Applicants mean the second impedance differs from the first impedance by more than about plus or minus ten percent (10%).

In certain embodiments, if Applicants' method determines in step 740 that the impedance of the reference circuit did not change, i.e. if the second impedance does not substantially differ from the first impedance, Applicants' method transitions from 740 to step 785 wherein a different tape drive unit is designated. Applicants' method transitions from step 785 to step 710 and continues using the newly-designated tape drive unit. In certain embodiments, the tape cartridge is automatically ejected from the first tape drive and transported to the newly-designated tape drive by an accessor, such as accessor 110 (FIG. 1)/120 (FIG. 1)/210 (FIG. 2). In other embodiments, manual intervention is required to eject the tape cartridge from the first tape drive and insert the tape cartridge into a second tape drive.

In certain embodiments, if Applicants' method determines in step 740 that the impedance of the reference circuit did not change, i.e. if the second impedance does not substantially differ from the first impedance, in certain embodiments Applicants' method transitions from 740 to step 790 wherein Applicants' method provides an error message. In certain embodiments, the error message of step 790 is provided to the requesting host computer. In certain embodiments, the error message of step 790 is provided to the library controller. In certain embodiments, the error message of step 790 is provided to the tape drive controller.

In certain embodiments, if Applicants' method determines in step 740 that the impedance of the reference circuit did not change, i.e. if the second impedance does not substantially differ from the first impedance, Applicants' method invokes certain error recovery procedures. For example, in certain embodiments if Applicants' method determines that the impedance of the reference circuit did not change upon tape insertion, then Applicants' method transitions from step 740 to step 760 wherein the designated cartridge is ejected from the tape drive.

In certain embodiments, Applicants' method transitions from step 760 to step 770 wherein the designated tape/cartridge is reinserted into the designated tape drive. Applicants' method transitions from step 770 to step 775 wherein Applicants' method at a fourth time determines the impedance of the reference circuit. Applicants' method transitions from step 775 to step 780 wherein Applicants' method compares the first impedance of step 710 to the third impedance of step 775. If Applicants' method determines in step 780 that the third impedance substantially differs from the first impedance, then Applicants' method transitions from step 780 to step 750 wherein the requested drive operation is performed. Alternatively, if Applicants' method determines in step 780 that the third impedance does not substantially differ from the first impedance, then Applicants' method transitions from step 780 to step 785. In certain embodiments, Applicants' method transitions from step 785 to step 710 and continues. In certain embodiments, Applicants' method transitions from step 785 to step 790 and continues.

Applicants' invention includes an article of manufacture comprising a computer useable medium having computer readable program code disposed therein for monitoring leader pin positioning in a threader block. Applicants' invention further includes computer program products embodied as program code to monitor leader pin positioning in a threader block. The individual steps recited in FIG. 7 may be combined, eliminated, or reordered.

While the preferred embodiments of the present invention have been illustrated in detail, it should be apparent that modifications and adaptations to those embodiments may occur to one skilled in the art without departing from the scope of the present invention as set forth in the following claims.

We claim:

1. A threader block assembly disposed in a tape drive, comprising:

a first circuit comprising a first coil;

a second circuit comprising a second coil, wherein said second circuit has an impedance;

wherein said first coil is disposed adjacent said second coil, such that said first coil and said second coil comprise an air core transformer;

a detection circuit which detects said impedance;

wherein said second circuit has a first impedance when said first circuit is open, and wherein said second circuit has a second impedance when said first circuit is closed;

a first fixturing device;

a first contact disposed on said first fixturing device;

a second fixturing device;

a second contact disposed on said second fixturing device;

wherein said first fixturing device and said second fixturing device are capable of simultaneously releaseably attaching a tape leader pin disposed on a magnetic tape disposed in said tape drive; and wherein said tape leader pin makes electrical contact with said first contact and said second contact when said tape leader pin is releaseably attached to said first fixturing device and to said fixturing device.

2. The threader block assembly of claim 1, wherein said second circuit comprises an LC circuit.

3. A threader block assembly disposed in a tape drive, comprising:

a first fixturing device;

a second fixturing device;

wherein said first fixturing device and said second fixturing device are capable of simultaneously releaseably attaching a tape leader pin disposed on a magnetic tape disposed in said tape drive;

a first member;

a second member, wherein said second member is pivotably attached to said first member;

wherein said second member comprises said first fixturing device, and wherein said second member comprises said second fixturing device;

a first contact disposed on said first fixturing device;

a second contact disposed on said second fixturing device;

wherein said tape leader pin makes electrical contact with said first contact and said second contact when said tape leader pin is releaseably attached to said first fixturing device and to said second fixturing device;

a first circuit comprising a first coil, said first contact, and said second contact;

a second circuit comprising a second coil, wherein said second circuit has an impedance;

wherein said first coil is disposed adjacent said second coil;

a detection circuit which detects said impedance;

wherein said second circuit has a first impedance when said first circuit is open, and wherein said second circuit has a second impedance when said first circuit is closed;

wherein said detection circuit provides first information if said detection circuit detects said second impedance.

4. A tape drive, comprising:

a tape drive controller;

a first circuit comprising a first coil;

a second circuit comprising a second coil, wherein said second circuit has an impedance;

wherein said first coil in combination with said second coil comprises an air core transformer;

a detection circuit which detects said impedance;

wherein said second circuit has a first impedance when said first circuit is open, and wherein said second circuit has a second impedance when said first circuit is closed; and wherein said detection circuit provides first information to said drive controller if said detection circuit detects said second impedance.

5. The tape drive of claim 4, further comprising:

a first fixturing device;

a first contact disposed on said first fixturing device;

a second fixturing device;

a second contact disposed on said second fixturing device;

wherein said first fixturing device and said second fixturing device are capable of simultaneously releaseably attaching a tape leader pin disposed on a magnetic tape disposed in said tape drive; and wherein said tape leader pin makes electrical contact with said first contact and said second contact when said tape leader pin is releaseably attached to said first fixturing device and to said second fixturing device.

6. The tape drive of claim 5, further comprising:

a first member;

a second member, wherein said second member is pivotably attached to said first member;

wherein said second member comprises said first fixturing device, and wherein said second member comprises said second fixturing device.

7. A tape drive, comprising:

a first fixturing device;

a second fixturing device;

wherein said first fixturing device and said second fixturing device are capable of simultaneously releaseably attaching a tape leader pin disposed on a magnetic tape disposed in said tape drive;

a first member;

a second member, wherein said second member is pivotably attached to said first member;

wherein said second member comprises said first fixturing device, and wherein said second member comprises said second fixturing device;

a first contact disposed on said first fixturing device;

a second contact disposed on said second fixturing device;

wherein said tape leader pin makes electrical contact with said first contact and said second contact when said tape leader pin is releaseably attached to said first fixturing device and to said second fixturing device;

a first circuit comprising a first coil, said first contact, and said second contact;

an LC circuit comprising a second coil, wherein said LC circuit has an impedance;

wherein said first coil in combination with said second coil comprises an air core transformer;

a detection circuit which detects said impedance;

wherein said LC circuit has a first impedance when said first circuit is open, and wherein said LC circuit has a second impedance when said first circuit is closed;

wherein said detection circuit provides first information when said detection circuit detects said second impedance.

8. A data storage and retrieval system, comprising a tape drive, wherein said tape drive comprises:

a first circuit comprising a first coil;

a second circuit comprising a second coil, wherein said second circuit has an impedance;

wherein said first coil in combination with said second coil comprises an air core transformer;

a detection circuit which detects said impedance;

wherein said second circuit has a first impedance when said first circuit is open, and wherein said second circuit has a second impedance when said first circuit is closed;

a first fixturing device;

a first contact disposed on said first fixturing device;

a second fixturing device;

a second contact disposed on said second fixturing device;

wherein said first fixturing device and said second fixturing device are capable of simultaneously releaseably attaching a tape leader pin disposed on a magnetic tape disposed in said tape drive; and wherein said tape leader pin makes electrical contact with said first contact and said second contact when said tape leader pin is releaseably attached to said first fixturing device and to said fixturing device.

9. The data storage and retrieval system of claim 8, further comprising a controller, wherein said detection circuit provides first information to said controller if said detection circuit detects said second impedance.

10. A data storage and retrieval system, comprising a tape drive, wherein said tape drive comprises:

a first fixturing device;

a second fixturing device;

wherein said first fixturing device and said second fixturing device are capable of simultaneously releaseably attaching a tape leader pin disposed on a magnetic tape disposed in said tape drive;

a first member;

a second member, wherein said second member is pivotably attached to said first member;

wherein said second member comprises said first fixturing device, and wherein said second member comprises said second fixturing device;

a first contact disposed on said first fixturing device;

a second contact disposed on said second fixturing device;

wherein said tape leader pin makes electrical contact with said first contact and said second contact when said tape leader pin is releaseably attached to said first fixturing device and to said second fixturing device;

a first circuit comprising a first coil, said first contact, and said second contact;

an second circuit comprising a second coil, wherein said second circuit has an impedance;

wherein said first coil in combination with said second coil comprises an air core transformer;

a detection circuit which detects said impedance;

wherein said second circuit has a first impedance when said first circuit is open, and wherein said second circuit has a second impedance when said first circuit is closed;

wherein said detection circuit provides first information if said detection circuit detects said second impedance.

11. A method to monitor the position of a tape leader pin in a tape drive, wherein said tape leader pin is disposed on a magnetic tape, wherein said tape drive comprises:

a first fixturing device;

a second fixturing device;

wherein said first fixturing device and said second fixturing device are capable of simultaneously releaseably attaching said tape leader pin;

a first contact disposed on said first fixturing device;

a second contact disposed on said second fixturing device;

wherein said tape leader pin makes electrical contact with said first contact and said second contact when said tape leader pin is releaseably attached to said first fixturing device and to said second fixturing device;

a first circuit comprising a first coil, said first contact, and said second contact;

an second circuit comprising a second coil, wherein said second circuit has an impedance, and wherein said first coil in combination with said second coil comprises an air core transformer;

a detection circuit which detects said impedance;

said method comprising the steps of:

determining at a first time a first impedance of said second circuit before disposing said magnetic tape in said tape drive;

disposing at a second time said magnetic tape in a first tape drive;

measuring at a third time a second impedance of said second circuit; and determining if said first impedance substantially differs from said second impedance.

12. The method of claim 11, further comprising the steps of:

receiving a request from a host computer to perform a drive operation using said magnetic tape; and operative if said first impedance substantially differs from said second impedance, performing said drive operation.

13. The method of claim 12, further comprising the steps of:

operative if said first impedance does not substantially differ from said second impedance:

ejecting said tape from said first tape drive; and reinserting said tape in said first tape drive.

14. The method of claim 13, further comprising the steps of:

designating a second tape drive;

ejecting said tape from said first tape drive;

inserting said tape in said second tape drive.

15. The method of claim 11, further comprising the step of providing an error message.

16. A method to monitor the position of a tape leader pin in a tape drive, wherein said tape leader pin is disposed on a magnetic tape, wherein said tape drive comprises:

a first fixturing device;

a second fixturing device;

wherein said first fixturing device and said second fixturing device are capable of simultaneously releaseably attaching said tape leader pin;

a first contact disposed on said first fixturing device;

a second contact disposed on said second fixturing device;

wherein said tape leader pin makes electrical contact with said first contact and said second contact when said tape leader pin is releaseably attached to said first fixturing device and to said second fixturing device;

a first circuit comprising a first coil, said first contact, and said second contact;

a second circuit comprising a second coil, wherein said second circuit has an impedance, and wherein said first coil in combination with said second coil comprises an air core transformer;

a detection circuit which detects said impedance;

said method comprising the steps of:

receiving a request from a host computer to perform a drive operation using said magnetic tape;

determining at a first time a first impedance of said second circuit before disposing said magnetic tape in said tape drive;

disposing at a second time said magnetic tape in a first tape drive;

measuring at a third time a second impedance of said second circuit;

determining if said first impedance substantially differs from said second impedance;

operative if said first impedance substantially differs from said second impedance, performing said drive operation operative if said first impedance does not differ from said second impedance:

designating a second tape drive;

ejecting said tape from said first tape drive; and inserting said tape in said second tape drive.

17. An article of manufacture comprising a computer useable medium having computer readable program code disposed therein to monitor the position of a tape leader pin in a first tape drive, wherein said tape leader pin is disposed on a magnetic tape, wherein said first tape drive comprises:

a first fixturing device;

a second fixturing device;

wherein said first fixturing device and said second fixturing device are capable of simultaneously releaseably attaching said tape leader pin;

a first contact disposed on said first fixturing device;

a second contact disposed on said second fixturing device;

wherein said tape leader pin makes electrical contact with said first contact and said second contact when said tape leader pin is releaseably attached to said first fixturing device and to said second fixturing device;

a first circuit comprising a first coil, said first contact, and said second contact;

a second circuit comprising a second coil, wherein said second circuit has an impedance, and wherein said first coil in combination with said second coil comprises an air core transformer;

a detection circuit which detects said impedance;

the computer readable program code comprising a series of computer readable program steps to effect:

determining at a first time a first impedance of said second circuit before disposing said magnetic tape in a first tape drive;

disposing at a second time said magnetic tape in said first tape drive;

measuring at a third time a second impedance of said second circuit; and determining if said first impedance substantially differs from said second impedance.

18. The article of manufacture of claim 17, said computer readable program code further comprising a series of computer readable program steps to effect:

receiving a request from a host computer to perform a drive operation using said magnetic tape; and operative if said first impedance differs from said second impedance, performing said drive operation.

19. The article of manufacture of claim 17, said computer readable program code further comprising a series of computer readable program steps to effect:

ejecting said tape from said first tape drive; and reinserting said tape in said first tape drive.

20. An article of manufacture comprising a computer useable medium having computer readable program code disposed therein to monitor the position of a tape leader pin in a first tape drive, wherein said tape leader pin is disposed on a magnetic tape, wherein said first tape drive comprises:

a first fixturing device;

a second fixturing device;

wherein said first fixturing device and said second fixturing device are capable of simultaneously releaseably attaching said tape leader pin;

a first contact disposed on said first fixturing device;

a second contact disposed on said second fixturing device;

wherein said tape leader pin makes electrical contact with said first contact and said second contact when said tape leader pin is releaseably attached to said first fixturing device and to said second fixturing device;

a first circuit comprising a first coil, said first contact, and said second contact;

a second circuit comprising a second coil, wherein said second circuit has an impedance, and wherein said first coil in combination with said second coil comprises an air core transformer;

a detection circuit which detects said impedance;

the computer readable program code comprising a series of computer readable program steps to effect:

receiving a request from a host computer to perform a drive operation using said magnetic tape;

determining at a first time a first impedance of said second circuit before disposing said magnetic tape in said tape drive;

disposing at a second time said magnetic tape in a first tape drive;

measuring at a third time a second impedance of said second circuit;

determining if said first impedance substantially differs from said second impedance;

operative if said first impedance substantially differs from said second impedance, performing said drive operation;

operative if said first impedance does not differ from said second impedance:

designating a second tape drive;

ejecting said tape from said first tape drive; and inserting said tape in said second tape drive.

21. A computer program product usable with a programmable computer processor having computer readable program code embodied therein to monitor the position of a tape leader pin in a tape drive, wherein said tape leader pin is disposed on a magnetic tape, wherein said tape drive comprises:

a first fixturing device;

a second fixturing device;

wherein said first fixturing device and said second fixturing device are capable of simultaneously releaseably attaching said tape leader pin;

a first contact disposed on said first fixturing device;

a second contact disposed on said second fixturing device;

wherein said tape leader pin makes electrical contact with said first contact and said second contact when said tape leader pin is releaseably attached to said first fixturing device and to said second fixturing device;

a first circuit comprising a first coil, said first contact, and said second contact;

a second circuit comprising a second coil, wherein said second circuit has an impedance, and wherein said first coil in combination with said second coil comprises an air core transformer;

a detection circuit which detects said impedance;

said computer code product comprising:

computer readable program code which causes said programmable computer processor to determine at a first time a first impedance of said second circuit before disposing said magnetic tape in said tape drive;

computer readable program code which causes said programmable computer processor to dispose at a second time said magnetic tape in a first tape drive;

computer readable program code which causes said programmable computer processor to measure at a third time a second impedance of said second circuit; and computer readable program code which causes said programmable computer processor to determine if said first impedance substantially differs from said second impedance.

22. The computer program product of claim 21, further comprising:

computer readable program code which causes said programmable computer processor to receive a request from a host computer to perform a drive operation using said magnetic tape; and computer readable program code which, if said first impedance differs from said second impedance, causes said programmable computer processor to perform said drive operation.

23. The computer program product of claim 21, further comprising:

computer readable program code which, if said first impedance does not differ from said second impedance, causes said programmable computer processor to eject said tape from said first tape drive, and reinsert said tape in said first tape drive.

24. The computer program product of claim 21, further comprising:

computer readable program code which causes said programmable computer processor to designate a second tape drive;

computer readable program code which causes said programmable computer processor to insert said tape in said second tape drive.

25. A computer program product usable with a programmable computer processor having computer readable program code embodied therein to monitor the positioning of a tape leader pin in a tape drive, wherein said tape leader pin is disposed on a magnetic tape, wherein said tape drive comprises:

a first fixturing device;

a second fixturing device;

wherein said first fixturing device and said second fixturing device are capable of simultaneously releaseably attaching said tape leader pin;

a first contact disposed on said first fixturing device;

a second contact disposed on said second fixturing device;

wherein said tape leader pin makes electrical contact with said first contact and said second contact when said tape leader pin is releaseably attached to said first fixturing device and to said second fixturing device;

a first circuit comprising a first coil, said first contact, and said second contact;

a second circuit comprising a second coil, wherein said second circuit has an impedance, and wherein said first coil in combination with said second coil comprises an air core transformer;

a detection circuit which detects said impedance;

said computer program product comprising:

computer readable program code which causes said programmable computer processor to receive a request from a host computer to perform a drive operation using said magnetic tape;

computer readable program code which causes said programmable computer processor to determine at a first time a first impedance of said second circuit before disposing said magnetic tape in said tape drive;

computer readable program code which causes said programmable computer processor to dispose at a second time said magnetic tape in a first tape drive;

computer readable program code which causes said programmable computer processor to measure at a third time a second impedance of said second circuit;

computer readable program code which causes said programmable computer processor to determine if said first impedance substantially differs from said second impedance;

computer readable program code which, if said first impedance substantially differs from said second impedance, causes said programmable computer processor to perform said drive operation;

computer readable program code which, if said first impedance does not substantially differ from said second impedance, causes said programmable computer processor to designate a second tape drive, eject said tape from said first tape drive, and insert said tape in said second tape drive.

\* \* \* \* \*